US011425532B2

(12) United States Patent
Miller et al.

(10) Patent No.: US 11,425,532 B2
(45) Date of Patent: Aug. 23, 2022

(54) ESTABLISHING LOCATION SHARING CONFIGURATIONS

(71) Applicant: Glympse, Inc., Seattle, WA (US)

(72) Inventors: Stephen Miller, Seattle, WA (US);
Christopher Park, Seattle, WA (US);
Stephen Rakonza, Seattle, WA (US)

(73) Assignee: Glympse, Inc., Seattle, WA (US)

( * ) Notice: Subject to any disclaimer, the term of this patent is extended or adjusted under 35 U.S.C. 154(b) by 28 days.

(21) Appl. No.: 16/812,253

(22) Filed: Mar. 6, 2020

(65) Prior Publication Data

US 2020/0213812 A1 Jul. 2, 2020

Related U.S. Application Data

(63) Continuation of application No. 16/209,911, filed on Dec. 4, 2018, now Pat. No. 10,623,907.

(60) Provisional application No. 62/596,498, filed on Dec. 8, 2017.

(51) Int. Cl.
*H04W 4/029* (2018.01)
*H04W 4/40* (2018.01)
*G01C 21/34* (2006.01)
*H04W 4/02* (2018.01)

(52) U.S. Cl.
CPC ........ *H04W 4/029* (2018.02); *G01C 21/3415* (2013.01); *G01C 21/3438* (2013.01); *G01C 21/3492* (2013.01); *H04W 4/40* (2018.02); *H04W 4/023* (2013.01); *H04W 4/027* (2013.01)

(58) Field of Classification Search
CPC .... H04W 4/029; H04W 4/40; G01C 21/3438; G01C 21/3415; G01C 21/3492
See application file for complete search history.

(56) References Cited

U.S. PATENT DOCUMENTS

| | | | | |
|---|---|---|---|---|
| 2009/0319172 | A1* | 12/2009 | Almeida | G06Q 30/02 |
| | | | | 701/533 |
| 2010/0299060 | A1* | 11/2010 | Snavely | H04W 4/20 |
| | | | | 701/533 |
| 2012/0302256 | A1* | 11/2012 | Pai | H04W 4/02 |
| | | | | 455/456.2 |
| 2012/0302258 | A1* | 11/2012 | Pai | H04L 51/20 |
| | | | | 455/456.2 |
| 2013/0144523 | A1* | 6/2013 | Haney | H04L 67/1046 |
| | | | | 701/482 |

(Continued)

*Primary Examiner* — Christopher M Brandt
(74) *Attorney, Agent, or Firm* — Perkins Coie LLP

(57) ABSTRACT

Embodiments for establishing configurations for a location sharing session are described. A location sharing session can include a sharing device gathering location data and providing it to a recipient device, e.g. via a server system. Configurations for a sharing session can include, for example: a duration that the sharing device provides the location data or that the sever system permits access to location data by the recipient device; preferences for how to manually or automatically set the duration for the sharing session; options to automatically end the sharing session; etc. A sharing session duration can be automatically set based on, e.g. an estimated time of arrival, a specified mode of transport, etc., and can include a specified amount of buffer time. The automatic share duration can last until a particular event occurs, e.g. the sharing device arriving at a particular location.

20 Claims, 7 Drawing Sheets

(56) References Cited

U.S. PATENT DOCUMENTS

| | | | |
|---|---|---|---|
| 2013/0226453 A1* | 8/2013 | Trussel | G01C 21/3614 |
| | | | 701/533 |
| 2014/0278053 A1* | 9/2014 | Wu | G01C 21/3647 |
| | | | 701/408 |
| 2014/0329548 A1* | 11/2014 | Tharshanan | H04W 4/029 |
| | | | 455/457 |
| 2015/0172858 A1* | 6/2015 | Choi | H04W 12/02 |
| | | | 455/456.1 |
| 2015/0195235 A1* | 7/2015 | Trussel | H04L 51/20 |
| | | | 455/413 |
| 2015/0264183 A1* | 9/2015 | Guo | H04M 3/56 |
| | | | 379/202.01 |
| 2015/0356516 A1* | 12/2015 | Kagan | G06Q 10/1095 |
| | | | 705/7.19 |
| 2016/0073223 A1* | 3/2016 | Woolsey | H04W 4/02 |
| | | | 455/457 |
| 2016/0138930 A1* | 5/2016 | Akiyama | H04W 4/029 |
| | | | 701/465 |
| 2016/0155088 A1* | 6/2016 | Pylappan | G06Q 10/0836 |
| | | | 705/333 |
| 2016/0192315 A1* | 6/2016 | Paek | H04W 4/02 |
| | | | 455/456.1 |
| 2016/0294957 A1* | 10/2016 | Samant | G06Q 10/0833 |
| 2017/0019768 A1* | 1/2017 | Yoon | H04L 69/28 |
| 2017/0048686 A1* | 2/2017 | Chang | H04W 52/0209 |
| 2017/0255667 A1* | 9/2017 | Ochiai | G06F 16/2365 |
| 2019/0182626 A1 | 6/2019 | Miller et al. | |

* cited by examiner

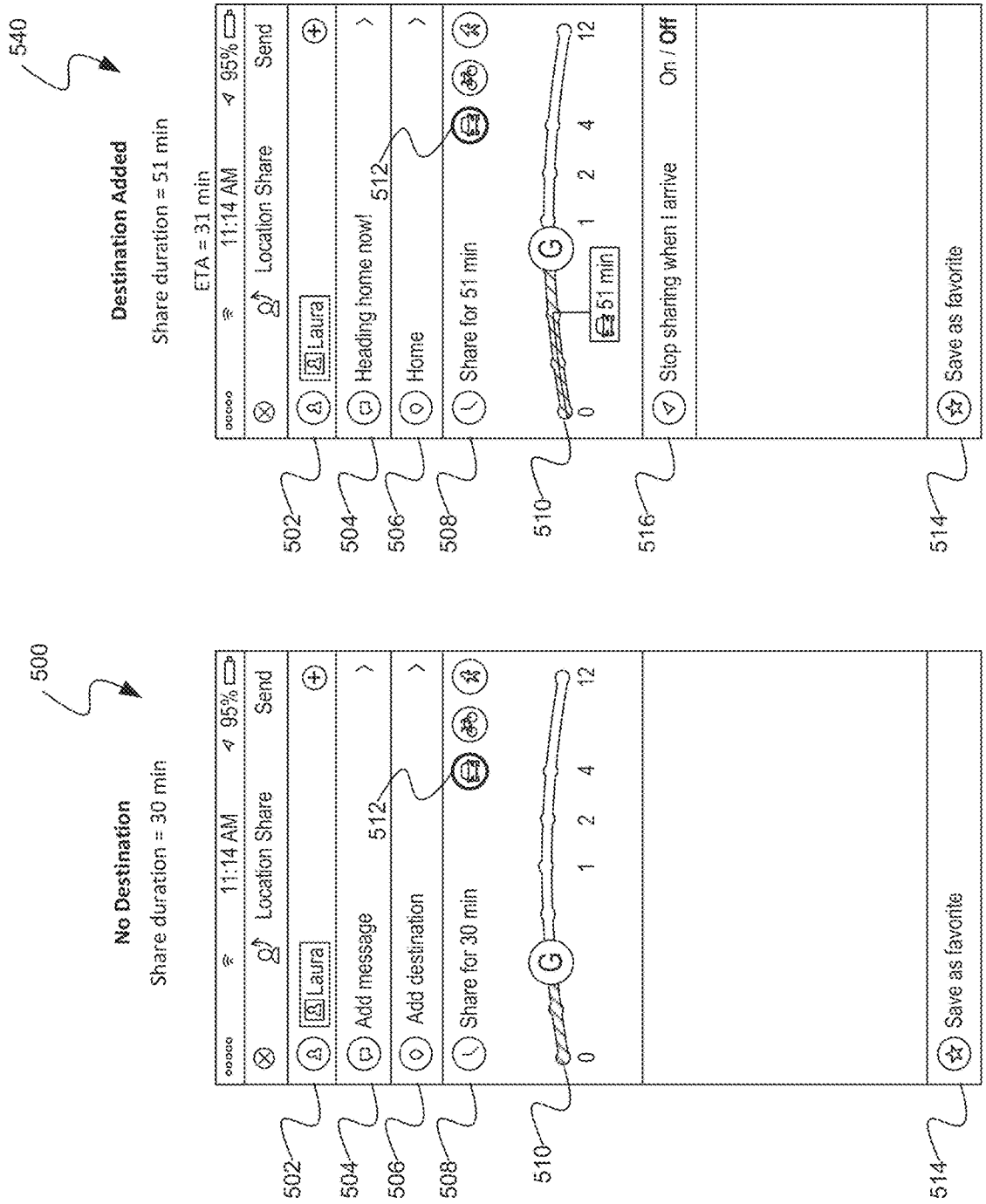

ESTABLISHING LOCATION SHARING CONFIGURATIONS

CROSS-REFERENCES TO RELATED APPLICATIONS

This application is a continuation of U.S. patent application Ser. No. 16/209,911, filed on Dec. 4, 2018, and entitled "ESTABLISHING LOCATION SHARING CONFIGURATIONS;" which claims the benefit of U.S. Provisional Patent Application Ser. No. 62/596,498, filed on Dec. 8, 2017, and entitled "ESTABLISHING LOCATION SHARING CONFIGURATIONS;" both of which are hereby incorporated by reference in their entireties.

BACKGROUND

As internet connected mobile devices become ubiquitous, people are sharing more and more about their lives. For example, many people track how many steps they take, where they've been, and what they're buying. For some services such as photos and comments on social media, the technology allowing people to select what to share and with whom has become fast and simple. Many photo applications, step counters, and survey apps have integrated sharing capabilities that allow users to select how the collected data is distributed.

The ability to quickly and easily share a device's location, however, presents unique challenges that have been more difficult to overcome. Some reasons for this is a result of the non-static nature of a user's location, how quickly that data becomes stale, the sensitivity and security of location data, the resource intensive nature of gathering and distributing location data, and the difficulty of addressing all these aspects into a user-friendly environment. Accordingly, previous systems dealing with location data sharing have not adequately overcome these challenges.

BRIEF DESCRIPTION OF THE DRAWINGS

FIGS. 5A-C are conceptual diagrams illustrating an example share session options interface.

The techniques introduced here may be better understood by referring to the following Detailed Description in conjunction with the accompanying drawings, in which like reference numerals indicate identical or functionally similar elements.

DETAILED DESCRIPTION

Figure 1:
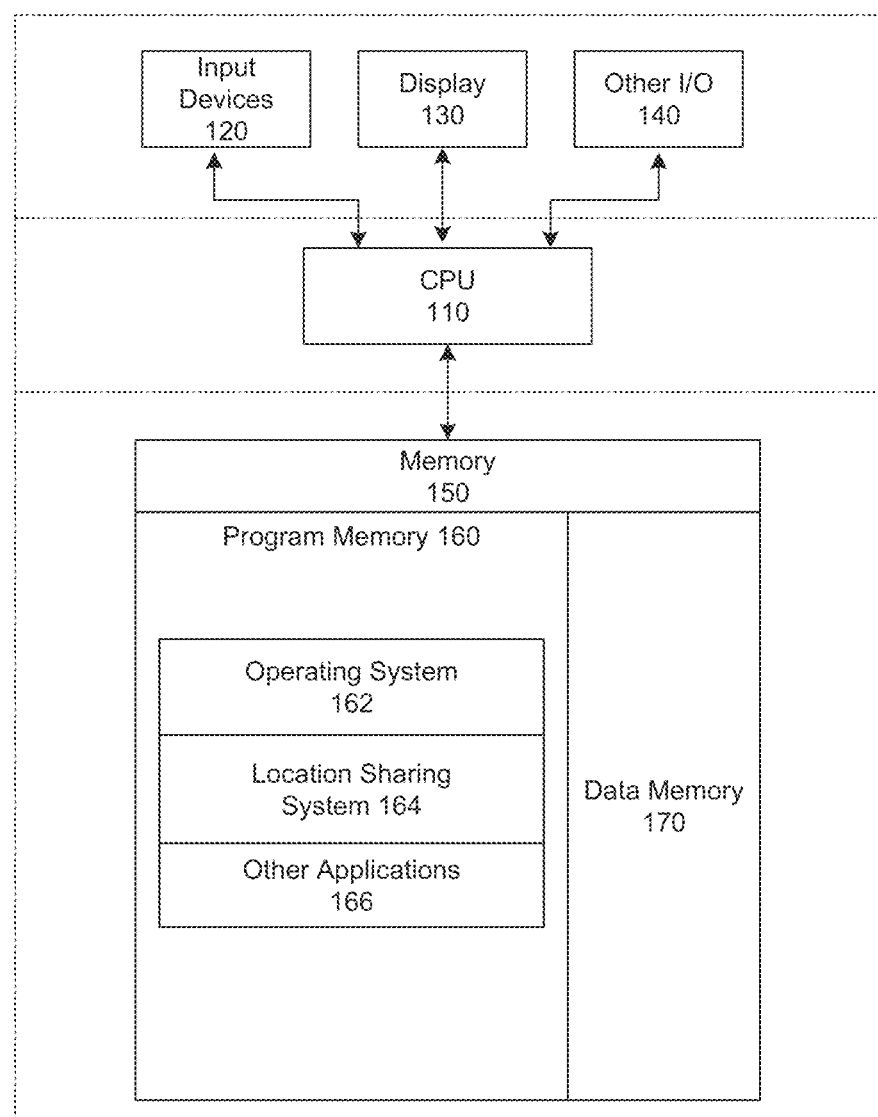
FIG. 1 is a block diagram illustrating an overview of devices on which some implementations can operate.

Embodiments for establishing configurations for a location sharing session are described. A location sharing session can include a mobile device gathering location data (a "sharing device") and providing it to another device (a "recipient device"), e.g. via a host system (a "server system"). Configurations for a sharing session, for example, can include: a duration that the sharing device provides the location data or that the sever system permits access to location data by the recipient device; preferences for how to manually or automatically set the duration for the sharing session; a granularity that the location data is taken at; options to automatically end the sharing session; prompts for user options to control the sharing session; or defaults for various characteristics of the sharing session.

In various implementations, a sharing session duration can be automatically set or set to a static duration. An automatically set duration can be set based on relevant data for a user indicated journey (e.g. indicated by setting a start or destination). In various implementations, the relevant journey data can include routing information, an estimated time of arrival (ETA), a specified mode of transport, speed (e.g. speed limits, typical speed by multiple users, expected speed of the current user, etc.), traffic conditions, terrain, weather conditions, etc.

In some implementations, an automatic share duration can be specified to last until a particular event occurs, such as when the sharing device is determined to have arrived at a particular location (e.g. a favorite location or a destination of a current journey), be within a threshold distance of a particular other device (such as the receiving device), or when the sharing device speed changes by a threshold amount (e.g. when the user of the sharing device moves from a vehicle to walking). In some implementations, this can be a setting specified upon initiating the sharing session, e.g. "Stop Share when I arrive." In some implementations, once selected, this option can continue to exist in the global settings, but can be later configured differently. In some implementations, the share duration can last until a set amount of time after the sharing device arrives at a particular location. For example, this can help facilitate a meet-up with the user of the receiving device.

In some circumstances, a static share duration can be set. For example, a static share duration can be set when a user selects a "favorite" share recipient for whom they previously selected a static share duration or for whom they have not previously selected whether to use a static or automatic share duration. As another example, a user can specify a preference to always use a static share duration. As yet a further example, a user can specify particular destinations or start locations for which a static share duration will be used. The static duration can be a default amount, a user specified amount, or a combination of these depending on various of the circumstances where a static duration is set.

In some implementations, a share duration (whether automatic or static) can be augmented by a buffer time. The buffer time can provide an improved user experience by preventing a share duration from expiring prior to a desired event, such as arrival at a destination. For example, a share duration without a buffer could expire due to unforeseen circumstances such as changes to traffic patterns, time for walking to a car, stopping to pick up something on the way, etc. In some implementations, an amount of buffer time that is added to a share duration can be based on a mapping of ETA ranges to buffer amounts. In some implementations, this mapping can be a "multiple of 10 buffer," which maps ETAs to buffer amounts as follows in table 1:

TABLE 1

| ETA | Multiple of 10 Buffer |
| --- | --- |
| 0-20 min | ETA + 10 min |
| 20-60 min | ETA + 20 min |

TABLE 1-continued

| ETA | Multiple of 10 Buffer |
|---|---|
| 1-2 hr | ETA + 30 min |
| 2-4 hr | ETA + 40 min |
| 4-8 hrs | ETA + 60 min |
| 8-12 hrs | ETA + 90 min (up to max of 12 hours) |

In some circumstances, the sharing device can provide various "smart prompts" to the user of the sharing device. Smart prompts can be triggered in various situations to notify a user of a status of a sharing session or to prompt the user about an opportunity to set or override a previously set sharing session configuration. For example, a smart prompt can warn a user if a share duration is set that is less than an ETA for a current or upcoming journey. As another example, a smart prompt can warn a user if they set a sharing duration longer than a threshold, such as 4 hours, e.g. the warning can advise the user she may need to have her device plugged into a charger. Another instance where the sharing device can provide a smart prompt is where a sharing session is about to expire but the system determines that a destination for a current journey has not yet been reached. For example, the smart prompt can provide an option to extend the sharing session for a particular amount of time or until the destination is reached.

The sending device and receiving device can provide various user experience environments (UX) in relation to configuring, initiating, and participating in a sharing session. For example, a UX at the sending device can include a settings interface where a user can specify defaults for the location sharing system such as whether to share the sharing device's location, whether to share the sharing device's speed, what type of units to use, whether to automatically stop sharing when a destination is reached, what locations are favorites (e.g. work, home, school, etc.), favorite recipients, what default static share duration to use, what buffer mappings to use, etc. Another UX at the sending device can include a share session options interface that allows the user of the sharing device to provide options and override defaults for a particular sharing session. For example, the share session options interface can have one or more fields for a user to configure the sharing session such as setting: recipients for the sharing session, a message for the recipient(s) to receive in an invite to the sharing session, a destination for a journey the sharing session will be for, a mode of transportation that will be taken in the journey, a duration for the sharing session, or an option to save the recipients or all of the current share session settings as a favorite. In some implementations, a previously saved favorite share session can be quickly selected to auto-fill the sharing session fields with the saved share session options. In some implementations, when auto-duration selection is enabled and a destination is set, the duration field can be set with an indication of an ETA and an indication of an added buffer time. In some implementations, when a user modifies settings affecting the ETA (e.g. changing mode of transportation) the ETA and buffer indicators can be automatically updated. In some implementations, these auto-duration values can be manually overridden by the user.

Figure 6:
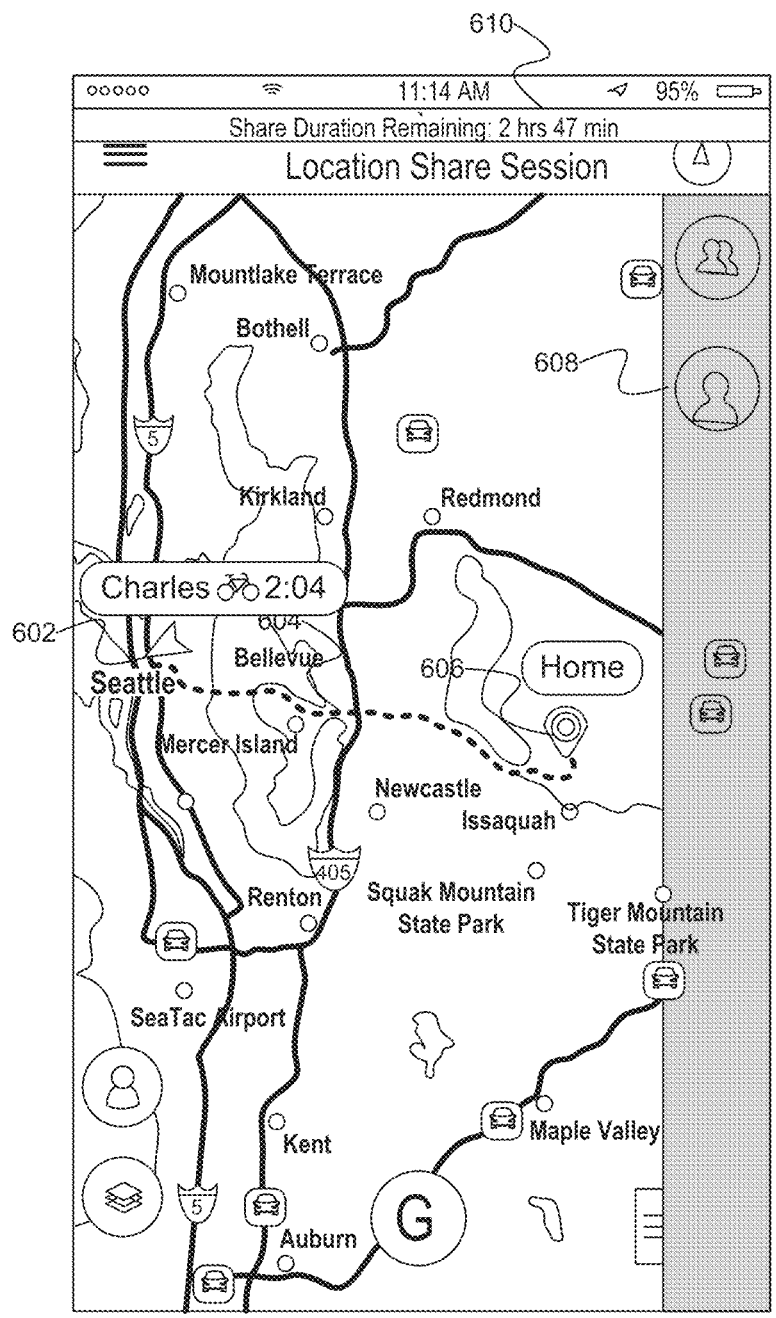
FIG. 6 is a conceptual diagram illustrating an example UX interface for an ongoing location sharing session.

In some implementations, a recipient can be associated with a communication channel (e.g. email, text, IM) and a location sharing session invite can be sent to the communication channel, which the recipient can open on any of multiple recipient devices. For example, a user can receive an email with a link to a location sharing session, on one of multiple possible recipient devices, the user can actuate the link to view an interface such as is illustrated in FIG. 6, by retrieving it from memory, downloading it through a network interface, or a combination thereof for various portions of the interface. In various implementations, this interface can be provided through a browser or another app.

While various personal data sharing technologies have been popular over the last several years, location sharing has been a challenge which the prior art has failed to fully address. The technology described herein overcomes several of the challenges in this field. By computing a particular time at which to control the sending device and/or the server system to stop location sharing, which is accomplished through the use of specific rules, the technology herein improves network performance by limiting service to when it is most likely wanted by users, saves valuable computing power and battery life in mobile devices, and provides a faster and easier user experience.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the described technology.

Suitable Computing System And Computing Environment

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that can operate in a location sharing system. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150 in a device or distributed across multiple devices. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, location sharing system 164, and other application programs 166. Memory 150 can also include data memory 170, such as location information; UI/UX data, maps, routes, etc.; or configuration data, settings, user options or preferences, user profile data, etc., which can be provided to the program memory 160 or any element of the device 100, e.g. CPU 110 while executing a program.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
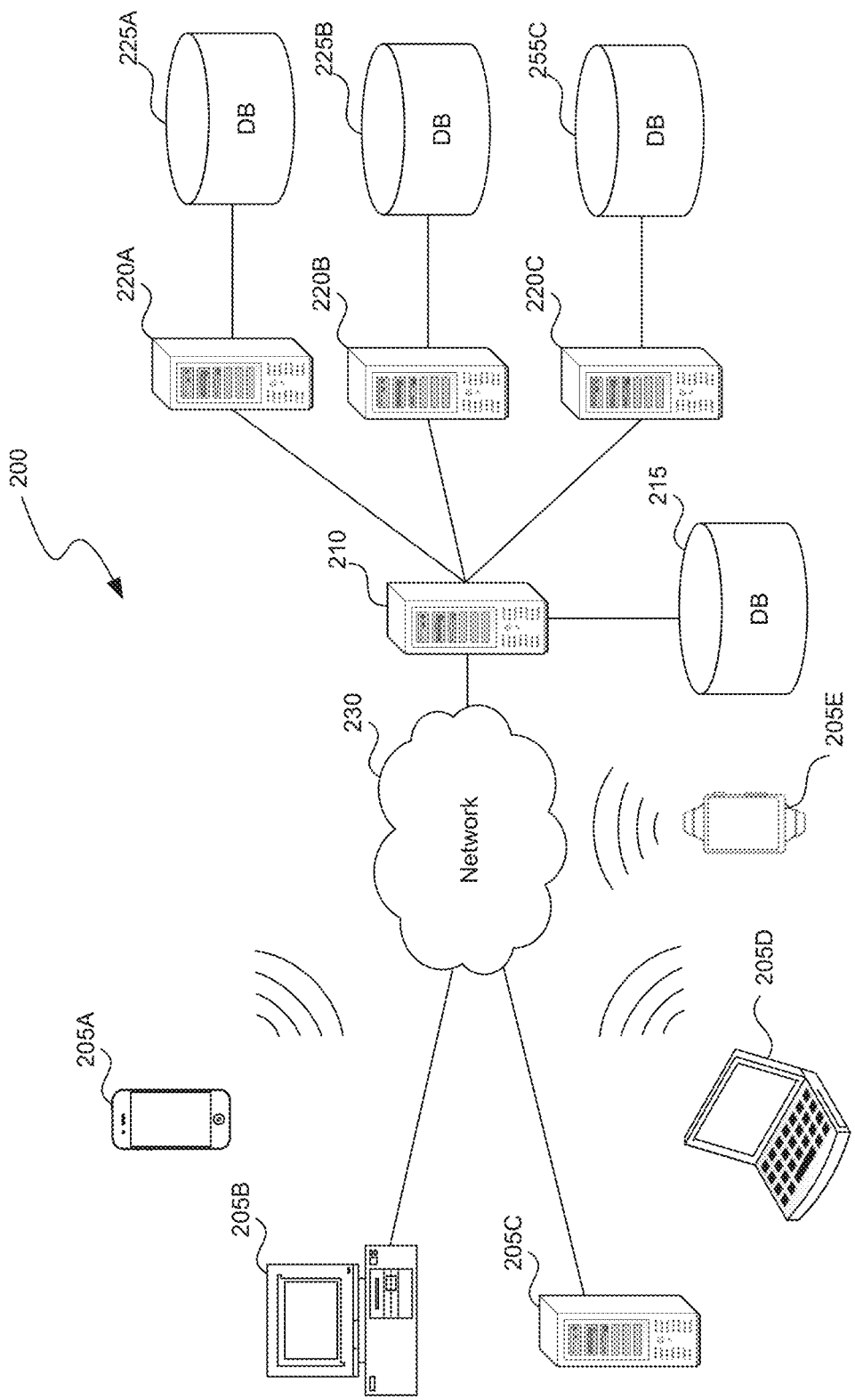
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-E, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as location data, route information, maps, user profiles, preferences, contacts, etc., mappings between share configurations and share duration buffers, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Establishing Location Sharing Configurations

Figure 3:
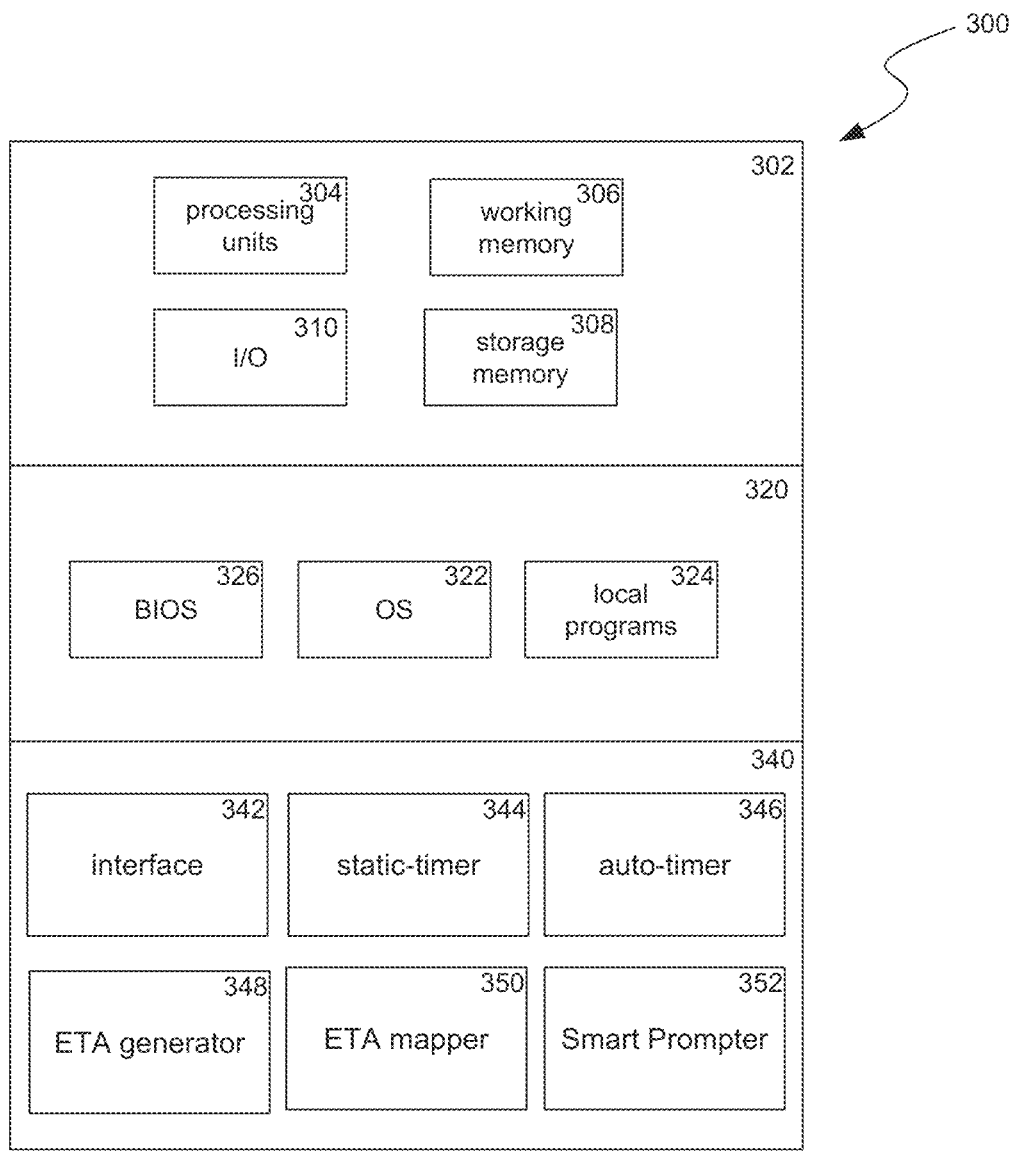
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include static-timer 344, auto-timer 346, ETA generator 348, ETA mapper 350, smart prompter 352, and components which can be used for transferring data and controlling the specialized components, such as interface 342. In some implementations, components 300 can be in a computing system that is distributed across multiple computing devices or can be an interface to a server-based application executing one or more of specialized components 340.

Static-timer 344 can provide a static duration for a location sharing session. This can be used when the user sets a manual share duration, due to a global static share duration preference, or when using a set of favorite location share settings that do not specify whether to use static or automatic durations (see e.g. the Yes branch from block 406 below). The static duration can be a default or manually set amount of time. Additional details on setting a static duration are described below in relation to block 408.

Auto-timer 346 can compute an automatic duration for a location sharing session. This can be used when the sharing session is not associated with a static duration (see e.g. the No branch from block 406 below). In some implementations, the automatic duration can be based on an ETA for a journey associated with the sharing session. In some implementations, the automatic duration can be a sum of the ETA plus a buffer time. In some implementations, a buffer time is only used for certain modes of transportation. Additional details on setting an automatic duration are described below in relation to blocks 410-414.

ETA generator 348 can be used by auto-timer 346 to determine an ETA for a journey associated with a current location sharing session. In some implementations, the ETA can be based on factors such as distance to the destination, traffic conditions, route characteristics (e.g. terrain, bridges, traffic lights, construction, accidents, toll plazas, etc.), mode of transit (e.g. car, bike, walking, public transit, taxi/ride-share, etc.), weather conditions, etc. In some implementations, ETA generator 348 can be an interface to an API of another system that computes and ETA for the journey. Additional details on obtaining a journey ETA are described below in relation to block 412.

ETA mapper 350 can be used by auto-timer 346 to determine a buffer time for the automatically determined share duration. In some implementations, the buffer time can be based on a mapping of ETA ranges to buffer times, an example of which is shown in table 1. In various implementations, a user can specify their own mapping, use a different default mapping, or have multiple mappings to select from for different location sharing sessions. Additional details on obtaining a buffer time are described below in relation to block 414.

Smart prompter 352 can cause the sharing device to provide prompts to a user when various triggers occur such as: when the share duration is set to be less than an ETA for a journey; when the share duration is set to greater than a threshold amount; or when the share duration ends or is about to end and the prompt can provide an option to extend the share duration. Additional details on smart prompts are described below in relation to block 416.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
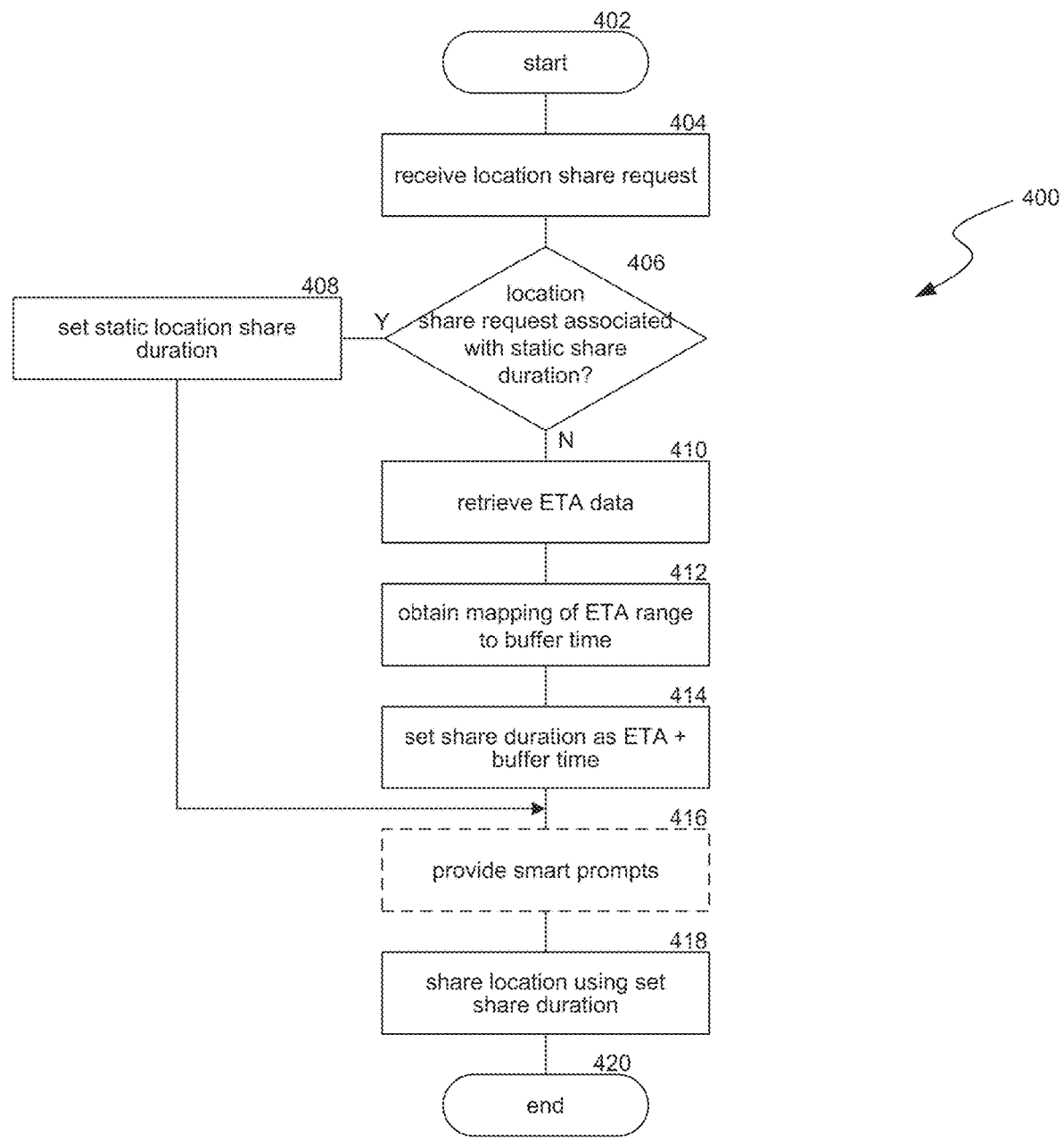
FIG. 4 is a flow diagram illustrating a process used in some implementations for establishing a configuration for a location sharing session.

FIG. 4 is a flow diagram illustrating a process 400 used in some implementations for establishing a configuration for a location sharing session. In various implementations, process 400 can be performed at a sharing device, at a server system, or at a combination of the two. Process 400 begins at block 402 and continues to block 404. At block 404, process 400 can receive a location sharing request. For example, this can be received via an "app" or web browser executed on a mobile device. In some implementations, the location sharing request can be associated with options for the sharing session, e.g. options set through a UX of the mobile device app such as the share session options interface described below in relation to FIGS. 5A-C or the settings UX described above.

At block 406, process 400 can determine whether the location share request is associated with a setting for a share session to be created with a static share duration. For example, the share session can be created with a static share duration when the location share request is initiated as a "favorite," where a share duration in the favorite was previously set to static or was not previously specified as either automatic or static. Other settings to indicate a static share duration can be through a global static setting or where the user specified a particular share duration when creating the location share request. If the location share request is associated with a static share duration, process 400 continues to block 408, if not, process 400 continues to block 410.

At block 408, process 400 can set a static share duration for the location sharing session. This can be a default static share duration (e.g. 30 minutes), a default value specified by the user for all static share durations, or a manually set share duration for the particular share session to override a default static share duration. In some implementations, where the share location request is associated with a static share duration due to the user selecting a favorite that did not have a set static/automatic selection, the use can be given an option (e.g. causing a prompt to be displayed) allowing the user to request an automatic share duration. If the user selects to switch to the automatic share duration, process 400 can switch to block 410 instead of setting the static share duration at block 408. Process 400 can then continue to block 416.

At block 410, process 400 can retrieve ETA data for a journey to a particular destination, associated with the location share request. The ETA data can be computed based on factors such as distance to the destination, traffic conditions, route characteristics (e.g. terrain, bridges, traffic lights, construction, accidents, toll plazas, etc.), mode of transit (e.g. car, bike, walking, public transit, taxi/ride-share, etc.), weather conditions, etc. Once an ETA is computed or otherwise obtained, process 400 can continue to block 412.

At block 412, process 400 can obtain a mapping of ETAs, or ETA ranges, to corresponding buffer times. In some implementations, the mapping can be the "multiple of 10" mapping specified above in table 1. In some implementations, the mapping can be a user specified mapping where a user can override particular ranges or specify a completely new mapping. In some implementations, the location system can specify multiple mappings (either by default or through user customization) which can be selected based on characteristics of the location share request, such as the destination, time of day, share recipient, etc. For example, a user can select a buffer mapping of "extended," where the buffer times are greater, when the use is not in a hurry, expects to make stops along the way, knows their route tends to have variable travel times, or when he is sharing his location with a trusted recipient and prefers to over-estimate the share duration as opposed to risking the sharing session ending before reaching his destination. As another example, the location system can automatically select a "tight" buffer mapping when the share recipient list includes people outside the sending user's trusted favorites, is a shared session that is available to the general public, or where the user has specified the mapping is to be used for certain share recipients. In some implementations, a buffer may not be added to the ETA for the share duration, e.g. for particular modes of transportation. Process 400 can then continue to block 414.

At block 414, process 400 can set an automatic share duration for the share session. This automatic share duration can be the sum of the ETA obtained at block 410 and the buffer time determined at block 414. In some implementations, various configurations can be specified for the share duration such as a configuration that will cause a prompt to be provided to a user of the sharing device upon a determination that the destination has been reached. In some implementations, another configuration that can be specified is to include a prompt or an extra buffer to be included to account for "meet-up time" after reaching a destination. For example, an extra 5 minute buffer can be applied to share durations where the mode of transportation is car, to account for walking time from the car to an actual destination. As another example, a prompt to end the sharing session can be provided upon a determination that the destination was reached a threshold amount of time (e.g. 5 minutes) ago. Process 400 can then continue to block 416.

At block 416, process 400 can cause one or more "smart prompts" to be provided via the sharing device or another device. For example, if the sharing device is a car and the destination has been reached, the smart prompt can be provided to the user's phone. In some implementations, a smart prompt can be provided when the share duration is set (e.g. manually) to less than an ETA for the journey of the current share session. In some implementations, a smart prompt can be provided when the share duration is set to greater than a threshold amount (e.g. four hours), such a notification can include a suggestion to connect a mobile device to a power source or can have an option to decrease the share duration. In some implementations, a smart prompt can be provided when the share duration ends, or is about to end, which can include an option to extend the share duration by an amount (e.g. five minutes) or until an event occurs (e.g. the destination is reached). In some implementations, the location sharing system can provide a limited number of such extension notifications, such as five. As discussed above, while in various implementations, any of the blocks in process 400 can be excluded, block 416 is shown in dashed lines to indicate that smart prompts are not included in some implementations, e.g. because the system is not configured to supply them or where a condition for a smart prompt does not occur. Process 400 can then continue to block 418.

At block 418, process 400 can initiate the locationسharing session using the share duration set at block 408 or 414. Process 400 can then continue to block 420, where it ends.

In various implementations, the blocks of process 400 can be performed all at a sharing device, all at a server system, or in combination—some at a sharing device some at a server system. Where the blocks of process 400 are performed the sharing device, in some implementations, a companion process can be performed at the server system. For example, the companion process can include one or more of: receiving information about the location sharing request or a user account it is associated with and determining a static or automatic share duration for the location sharing request. The static share duration can be based on, e.g., a default or preferences in an account for the user. The automatic share duration can be based on an ETA computed by the server system or by another server system (e.g. through an API) and any buffer time computed for the share duration. An indication of the determined share duration can be provided back to the sending device. The server system can also provide communications to the sending system to cause the sending system to provide smart prompts to the user, e.g. upon the server system determining a triggering event, such as the sending system reaching the destination or the share duration ending. The server system can also use the share duration to control whether location data is provided by the sharing device or whether it is sent to the recipient device.

In some implementations, the frequency that location information is provided to the recipient device can be based on where in the journey theسharing device is. For example, for the beginning or end of the journey (e.g. first or last mile or 10% of the journey) the sharing device's location can be received or sent with a higher frequency than in the middle part of the journey. This can facilitate providing more detail when the recipient is likely to be more interested in the sender's exact location while saving processing/battery/bandwidth when during the middle of the journey when the recipient is likely to care less about an exact position.

User Experience (UX) Interfaces

Figure 5C:
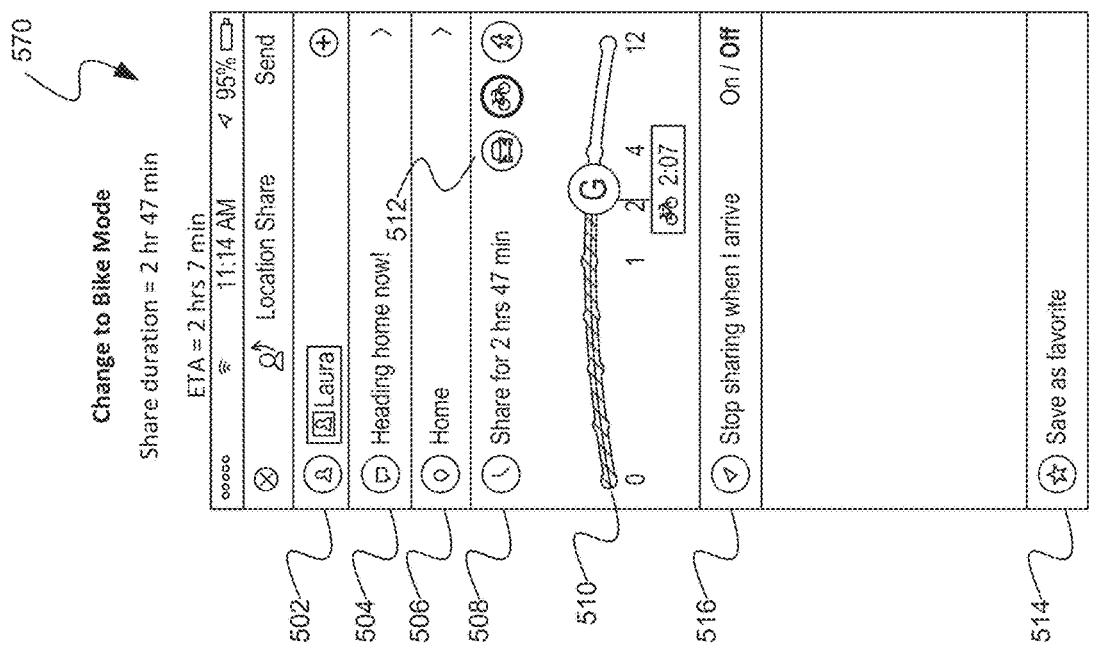

FIGS. 5A-C are conceptual diagrams illustrating an example share session options interface. FIG. 5A illustrates a UX interface 500 where the user has not yet specified a destination, so the share duration is set to a default of 30 minutes. FIG. 5A shows field 502 which allows a user to select share recipients, field 504 which allows the user to set a message to include with an invitation to the recipients to participate in the location sharing session, a field 506 which allows the user to set a destination for the journey associated with the location sharing session, a field 508 showing the currently set share duration and a control 510 to adjust the share duration, a control 512 which allows the user to set a mode of transportation for the journey associated with the location sharing session, and a control 514 to save the entries, of fields/controls 502-512, as a favorite. In UX interface 500, the user has only specified a recipient in field 502, the default "car" is set in control 512, and the default static duration 30 minutes is set in control 510, as indicated in field 508.

FIG. 5B illustrates a UX interface 540 where the user has set a destination "Home" in field 506 from a list of saved destinations. The user has also included a message in field 504 for share recipient Laura. Now that a destination has been specified, the location system has computed an ETA for that destination of 31 minutes. That ETA is shown on control 510. In this example, auto share durations are enabled as well as duration buffers using the "multiple of 10" buffer mapping, so the share duration is set to the ETA (31 minutes) plus the buffer time for the 20-60 minute ETA range (20 minutes)=51 minutes. The user has the option to actuate control 510 to override this auto share duration. Because a destination has been set in field 506, a new field 516 is also available. Field 516 provides the user the option to automatically end the sharing session when the destination is reached. In some implementations, this setting can operate to end the sharing session a threshold amount of time after the destination has been reached. In UX 540, the control 516 is set to Off, indicating that the share duration is controlled by control 510 as indicated by the time in field 508.

FIG. 5C illustrates a UX interface 570 where the user used control 512 to change the mode of transportation from "car" to "bike." In this example, buffers are configured to be removed for "bike" and "walking" modes of transportation as these modes are less susceptible to variation due to factors such as traffic and finding a parking space. That ETA is shown on control 510. This example does not use a buffer, so the share duration is set to the ETA (2 hr 7 minutes), as shown in field 508. Here again, the user has the option to actuate control 510 to override this auto share duration.

FIG. 6 is a conceptual diagram illustrating an example UX interface 600 for an ongoing location sharing session. UX interface 600 can be provided at a sharing device or a recipient device. UX interface 600 includes an indicator 602 showing the location, direction, mode of transit, expected time to arrival, and user name in relation to the sharing device. UX interface 600 also has a route 604 showing an expected route to destination 606. UX interface 600 includes a side bar with indication(s) 608 of members (e.g. recipients) of the share session. Additionally, UX interface 600 has an indication 610 showing the remaining time in the share duration for the current location sharing session.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the described technology is not intended to be exhaustive or to limit the described technology to the precise form disclosed above. While specific examples for the described technology are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the described technology provided herein can be applied to other systems, not necessarily the system described above. The elements and acts of the various examples described above can be combined to provide further implementations of the described technology. Some alternative implementations of the described technology may include not only additional elements to those implementations noted above, but also may include fewer elements.

These and other changes can be made to the described technology in light of the above Detailed Description. While the above description describes certain examples of the described technology, and describes the best mode contemplated, no matter how detailed the above appears in text, the described technology can be practiced in many ways. Details of the system may vary considerably in its specific implementation, while still being encompassed by the described technology. As noted above, particular terminology used when describing certain features or aspects of the described technology should not be taken to imply that the terminology is being redefined herein to be restricted to any specific characteristics, features, or aspects of the described technology with which that terminology is associated. In general, the terms used in the following claims should not be construed to limit the described technology to the specific examples disclosed in the specification, unless the above Detailed Description section explicitly defines such terms. Accordingly, the actual scope of the described technology encompasses not only the disclosed examples, but also all equivalent ways of practicing or implementing the described technology under the claims.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

We claim:

1. A method for triggering actions for a location sharing session, the method comprising:
    initiating the location sharing session for sharing location data captured at a sharing computing device with a receiving computing device;
    comparing at least two threshold conditions to at least two sharing session states,
        wherein the threshold conditions and the sharing session states, respectively, comprise two or more of:
            a threshold distance to a destination and a current distance to the destination,
            a threshold travel time to the destination and a current travel time to the destination,
            a threshold time since reaching the destination and an elapsed time since reaching the destination,
            a threshold rate of travel and a current rate of travel,
            a set of established locations and a starting point or destination set for the location sharing session, or
            an estimated time of arrival and a remaining duration of the location sharing session or a determined remaining device battery life;
    determining the activation of a trigger for a location sharing session action based on the comparison of the at least two threshold conditions to the at least two sharing session states; and
    in response to determining the activation of the trigger, performing the triggered location sharing session action comprising one or more of:
        changing a frequency with which the location data is captured from the sharing computing device;
        ending the location sharing session;
        setting a timeout for ending the location sharing session;
        providing a message with a prompt to extend a duration of the location sharing session; or
        providing a message with a prompt to charge the sharing computing device.

2. The method of claim 1, wherein the location sharing session further comprises sharing vehicle velocity data for the sharing computing device.

3. The method of claim 1,
    wherein at least one of the threshold conditions comprises the threshold distance to the destination or the threshold travel time to the destination,
    wherein at least one of the sharing session states comprises the current distance to the destination or the current travel time to the destination; and
    wherein the triggered location sharing session action comprises changing the frequency with which the location data is captured from the sharing computing device, to thereby reduce bandwidth usage and/or power consumption, such that:
        a) a first frequency that the location data is captured from the sharing computing device in a first time between 1) when the current distance to the destination or the current travel time to the destination is at the threshold distance to the destination or the threshold travel time from the destination and 2) when the sharing computing device is at the destination, is greater than
        b) a second frequency that the location data is captured from the sharing computing device for at least part of a second time that is before the first time.

4. The method of claim 1,
wherein:
    at least one of the threshold conditions comprises the threshold distance to the location or the threshold travel time to the destination and at least one of the sharing session states comprises the current distance to the location or the current travel time to the destination,
    at least one of the threshold conditions comprises the threshold time since reaching the destination and at least one of the sharing session states comprises the elapsed time since reaching the destination, or
    at least one of the threshold conditions comprises the threshold rate of travel and at least one of the sharing session states comprises the current rate of travel; and
wherein the triggered location sharing session action comprises ending the location sharing session.

5. The method of claim 1,
wherein at least one of the threshold conditions comprises the set of established locations;
wherein at least one of the sharing session states comprises the starting point or the destination set for the location sharing session; and
wherein the triggered location sharing session action comprises setting the timeout for ending the location sharing session.

6. The method of claim 1,
wherein at least one of the threshold conditions comprises the estimated time of arrival;
wherein at least one of the sharing session states comprises the remaining duration of the location sharing session; and
wherein the triggered location sharing session action comprises providing the message with the prompt to extend the duration of the location sharing session.

7. The method of claim 1,
wherein at least one of the threshold conditions comprises the estimated time of arrival;
wherein at least one of the sharing session states comprises the determined remaining device battery life; and
wherein the triggered location sharing session action comprises providing the message with the prompt to charge the sharing computing device.

8. The method of claim 1,
wherein at least one of the threshold conditions comprises the estimated time of arrival or the at least one sharing session states comprises the current distance to the destination or the current travel time to the destination; and
wherein at least one of the estimated time of arrival, the current distance to the destination, or the current travel time to the destination is based on one or more of: a selected mode of transportation, identified current weather conditions, determined speed characteristics of a current user that are based on previously observed driving speeds of the current user, or any combination thereof.

9. The method of claim 1,
wherein the sharing session action comprises ending the location sharing session, wherein ending the location sharing session is delayed for a buffer time; and
wherein the buffer time is based on a mapping of travel time ranges to corresponding buffer times.

10. A non-transitory computer-readable storage medium storing instructions that, when executed by a computing system, cause the computing system to perform operations for performing actions for a location sharing session that is for sharing location data captured at a sharing computing device with a receiving computing device, the operations comprising:
comparing at least two threshold conditions to at least two sharing session states,
wherein the threshold conditions and the sharing session states, respectively, comprise two or more of:
a threshold distance to a destination and a current distance to the destination,
a threshold travel time to the destination and a current travel time to the destination,
a threshold time since reaching the destination and an elapsed time since reaching the destination,
a threshold rate of travel and a current rate of travel,
a set of established locations and a starting point or destination set for the location sharing session, or
an estimated time of arrival and a remaining duration of the location sharing session or a determined remaining device battery life; and
in response to determining that at least one of the threshold conditions is met by at least one of the sharing session states, performing a location sharing session action comprising one or more of:
changing a frequency with which the location data is captured from the sharing computing device;
ending the location sharing session;
setting a timeout for ending the location sharing session;
providing a message with a prompt to extend a duration of the location sharing session; or
providing a message with a prompt to charge the sharing computing device.

11. The non-transitory computer-readable storage medium of claim 10,
wherein at least one of the threshold conditions comprises the threshold distance to the destination or the threshold travel time to the destination,
wherein at least one of the sharing session states comprises the current distance to the destination or the current travel time to the destination; and
wherein the location sharing session action comprises changing the frequency with which the location data is captured from the sharing computing device, to thereby reduce bandwidth usage and/or power consumption.

12. The non-transitory computer-readable storage medium of claim 10,
wherein:
at least one of the threshold conditions comprises the threshold distance to the location or the threshold travel time to the destination and at least one of the sharing session states comprises the current distance to the location or the current travel time to the destination,
at least one of the threshold conditions comprises the threshold time since reaching the destination and at least one of the sharing session states comprises the elapsed time since reaching the destination, or
at least one of the threshold conditions comprises the threshold rate of travel and at least one of the sharing session states comprises the current rate of travel; and
wherein the location sharing session action comprises ending the location sharing session.

13. The non-transitory computer-readable storage medium of claim 10,
wherein at least one of the threshold conditions comprises the set of established locations;
wherein at least one of the sharing session states comprises the starting point or the destination set for the location sharing session; and
wherein the location sharing session action comprises setting the timeout for ending the location sharing session.

14. The non-transitory computer-readable storage medium of claim 10,
wherein at least one of the threshold conditions comprises the estimated time of arrival;
wherein at least one of the sharing session states comprises the remaining duration of the location sharing session; and
wherein the location sharing session action comprises providing the message with the prompt to extend the duration of the location sharing session.

15. The non-transitory computer-readable storage medium of claim 10,
wherein at least one of the threshold conditions comprises the estimated time of arrival;
wherein at least one of the sharing session states comprises the determined remaining device battery life; and
wherein the location sharing session action comprises providing the message with the prompt to charge the sharing computing device.

16. A computing system comprising:
one or more processors; and
one or more memories storing instructions that, when executed by the one or more processors, cause the computing system to perform operations comprising:
comparing at least two threshold conditions to at least two sharing session states,
wherein the threshold conditions and the sharing session states, respectively, comprise two or more of:
a threshold distance to a destination and a current distance to the destination,
a threshold travel time to the destination and a current travel time to the destination,
a threshold time since reaching the destination and an elapsed time since reaching the destination,
a threshold rate of travel and a current rate of travel,
a set of established locations and a starting point or destination set for the location sharing session, or
an estimated time of arrival and a remaining duration of the location sharing session or a determined remaining device battery life; and
in response to determining that at least one of the threshold conditions is met by at least one of the sharing session states, performing a location sharing session action comprising one or more of:

changing a frequency with which location data is captured from a sharing computing device;

ending the location sharing session;

setting a timeout for ending the location sharing session;

providing a message with a prompt to extend a duration of the location sharing session; or providing a message with a prompt to charge the sharing computing device.

17. The computing system of claim 16, wherein at least one of the threshold conditions comprises the threshold distance to the destination or the threshold travel time to the destination, wherein at least one of the sharing session states comprises the current distance to the destination or the current travel time to the destination; and wherein the location sharing session action comprises changing the frequency with which the location data is captured from the sharing computing device.

18. The computing system of claim 16, wherein:

at least one of the threshold conditions comprises the threshold distance to the destination or the threshold travel time to the destination and at least one of the sharing session states comprises the current distance to the destination or the current travel time to the destination, at least one of the threshold conditions comprises the threshold time since reaching the destination and at least one of the sharing session states comprises the elapsed time since reaching the destination, or at least one of the threshold conditions comprises the threshold rate of travel and at least one of the sharing session states comprises the current rate of travel; and wherein the location sharing session action comprises ending the location sharing session.

19. The computing system of claim 16, wherein at least one of the threshold conditions comprises the set of established locations;

wherein at least one of the sharing session states comprises the starting point or the destination set for the location sharing session; and wherein the location sharing session action comprises setting the timeout for ending the location sharing session.

20. The computing system of claim 16, wherein at least one of the threshold conditions comprises the estimated time of arrival;

wherein at least one of the sharing session states comprises the remaining duration of the location sharing session; and wherein the location sharing session action comprises providing the message with the prompt to extend the duration of the location sharing session.

* * * * *